United States Patent [19]

Klingensmith et al.

[11] Patent Number: 5,175,245
[45] Date of Patent: Dec. 29, 1992

[54] MONO- OR BIAXIALLY DRAWN POLYKETONE FILMS

[75] Inventors: George B. Klingensmith, Virginia Beach, Va.; Randolph N. Campbell, Katy, Tex.

[73] Assignee: Shell Oil Company, Houston, Tex.

[21] Appl. No.: 778,551

[22] Filed: Oct. 18, 1991

Related U.S. Application Data

[60] Division of Ser. No. 639,858, Jan. 11, 1991, Pat. No. 5,073,327, which is a continuation-in-part of Ser. No. 411,771, Sep. 25, 1989, abandoned, and a continuation-in-part of Ser. No. 411,772, Sep. 25, 1989, abandoned.

[51] Int. Cl.⁵ .................. C08G 67/02; B29C 55/08
[52] U.S. Cl. .................. 528/392; 264/290.2; 264/264
[58] Field of Search .................. 528/392; 264/290.2, 264/264

[56] References Cited

U.S. PATENT DOCUMENTS

| | | | |
|---|---|---|---|
| 4,798,884 | 1/1989 | Brons et al. | 528/392 |
| 4,843,145 | 6/1989 | Drent et al. | 528/392 |

Primary Examiner—Morton Foelak
Assistant Examiner—Richard Jones
Attorney, Agent, or Firm—James O. Okorafor

[57] ABSTRACT

Processes for producing mono- and biaxially drawn polyketone films from linear polymers of carbon monoxide, ethylene, and at least one ethylenically unsaturated hydrocarbon having a melting point of at least 214° C., comprising drawing of a linear polymer sheet along one or two axes, respectively, at a draw temperature of from about 4° to 15° C. below the melting point of the terpolymer, and a draw ratio of between 4 to 20. Also disclosed are the products which have and exhibit good properties of strength and stiffness, even at low draw ratios, produced by these processes.

4 Claims, No Drawings

MONO- OR BIAXIALLY DRAWN POLYKETONE FILMS

This is a division of application Ser. No. 639,858, filed Jan. 11, 1991, now U.S. Pat. No. 5,073,327, is a continuation-in-part of application Ser. Nos. 411,771 and 411,772 filed on Sep. 25, 1989, both now abandoned.

FIELD OF THE INVENTION

This invention relates to stretched films produced from a linear alternating polymer of carbon monoxide and at least one ethylenically unsaturated hydrocarbon, and to methods of producing such films. More particularly, the invention relates to monoaxially and biaxially stretched or drawn films of a linear alternating terpolymer of carbon monoxide, ethylene and a second hydrocarbon, and to methods of producing such films.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,694,412.

More recently the class of linear alternating polymers of carbon monoxide and at least one ethylenically unsaturated hydrocarbon has become of greater interest in part because of the greater availability of the polymers. More recent processes for the production of such polymers, now becoming known as polyketones or polyketone polymers, are illustrated by a number of published European Patent Applications including 121,965, 181,014, 213,671 and 257,663. The process, now becoming broadly conventional, generally involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight thermoplastics processable by methods conventional for thermoplastics into a variety of shaped articles of established utility. One such utility is in the production of sheets and films useful in the packaging industry which are produced by methods such as extrusion. While such sheets and films have desirable properties, it would be of advantage to provide films of the polyketone polymers having better properties of stiffness and strength.

SUMMARY OF THE INVENTION

Accordingly, the present invention relates to process for producing a non-porous monoaxially or biaxially drawn polyketone film comprising a linear alternating terpolymer of carbon monoxide, ethylene and a second ethylenically unsaturated hydrocarbon of at least 3 carbon atoms, having a melting point of at least 214° C.; comprising the steps of drawing a sheet of said film along one or two axes, respectively, at a draw temperature of from 4°–15° C. below the melting point of the terpolymer, and at a draw ratio of within the range of from 4 to 20. The present invention also relates to a non-porous monoaxially or biaxially drawn polyketone film comprising a linear alternating terpolymer of carbon monoxide, ethylene and a second ethylenically unsaturated hydrocarbon of at least 3 carbon atoms, having a melting point of at least 214° C., produced by the steps comprising drawing a sheet of said film along one or two axes, respectively, at a draw temperature of from 4°–15° C. below the melting point of the terpolymer and at a draw ratio of within the range of from 4 to 20.

DESCRIPTION OF THE INVENTION

Although a variety of polymers of carbon monoxide and at least one ethylenically unsaturated hydrocarbon are useful in the process of the invention, the preferred polymers are linear alternating terpolymers wherein moieties of carbon monoxide alternate with moieties of ethylene and a second ethylenically unsaturated hydrocarbon of at least 3 carbon atoms and the polymer contains substantially one molecule of carbon monoxide for each molecule of ethylenically unsaturated hydrocarbon. The hydrocarbons useful as the second ethylenically unsaturated hydrocarbon are aliphatic such as propylene and other α-olefins, e.g., 1-butene, isobutylene, 1-hexene and 1-decene, or are arylaliphatic such as styrene and ring-alkylated styrenes, e.g., p-methylstyrene, p-ethylstyrene and m-methylstyrene. The preferred terpolymers are terpolymers of carbon monoxide, ethylene and, as the second hydrocarbon, an aliphatic α-olefin, especially propylene. Such polymers are therefore broadly represented by the repeating formula

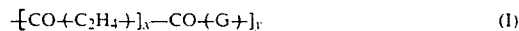

$$\text{\textemdash}[CO\text{\textemdash}(C_2H_4)]_x\text{\textemdash}CO\text{\textemdash}(G)\text{\textemdash}]_y \qquad (1)$$

wherein G is a moiety of the second ethylenically unsaturated hydrocarbon of at least 3 carbon atoms polymerized through the ethylenic unsaturation. The —CO—C₂H₄— units and the —CO—G— units are found randomly throughout the polymer chain and the ratio of y:x, generally less than about 0.5, reflects the proportions of ethylene and the second hydrocarbon in the terpolymer. The end groups or "caps" of the polymer chain will depend upon what materials were present during the production of the terpolymer and whether or how the terpolymer was purified. The overall properties of the terpolymer do not appear to depend to any considerable extent on the particular end groups so that the polymer is fairly represented by the above formula for the polymer chain.

The polyketone terpolymers of general interest are those of molecular weight from about 1000 to about 200,000, particularly those of molecular weight from about 20,000 to about 90,000. Such terpolymers have a melting point of from about 175° C. to about 270° C. and a limiting viscosity number (LVN), expressed in dl/g as measured in m-cresol at 60° C., of from about 0.8 to about 4, preferably from about 1.5 to about 2.5. For the purpose of producing the monoaxially and biaxially drawn films of the invention, however, the chemical composition and physical properties of suitable terpolymers are somewhat narrower in scope and all polyketone terpolymers of carbon monoxide, ethylene and second hydrocarbon are not equally useful in the production of stretched or drawn films according to the invention.

The polyketone terpolymers which are suitable for monoaxially and biaxially stretched film production according to the invention are those linear alternating terpolymers of the above formula I wherein the melting point of the terpolymer is at least 214° C. and preferably is at least 220° C. These melting points roughly correspond to terpolymers having contents of a second hydrocarbon of no more than about 5% by mole based on total polymer and preferably no more than about 3% by mole on the same basis. When the preferred second hydrocarbon propylene is employed, the terpolymer will be no more than about 6.5% by weight propylene and preferably no more than about 5% by weight propylene, on the same basis. The presence of some second hydrocarbon in the terpolymer is required. e.g., at least about 0.5% by mole based on total terpolymer, but the presence of second hydrocarbon in excess of about 5.0% by mole results in terpolymers having melting points below 214° C. and monoaxially or biaxially stretched films produced from terpolymers of such a composition exhibit lower strength, stiffness and lower high temperature resistance.

The terpolymers useful in the present invention were produced by the general processes of the above published European Patent Applications with attention to the amount of second hydrocarbon present in the reaction mixture and accordingly in the resulting linear alternating terpolymer. Although the scope of the polymerization process is extensive, the preferred catalyst composition is formed from a palladium alkanoate, particularly palladium acetate, the anion of trifluoroacetic acid or p-toluenesulfonic acid and a bidentate ligand of phosphorus selected from 1,3-bis(diphenylphosphino)-propane and 1,3-bis[di(2-methoxyphenyl)phosphino]-propane. The carbon monoxide and the ethylenically unsaturated hydrocarbons are contacted under polymerization conditions in the presence of the catalyst composition and a reaction diluent. Lower alkanols are suitable reaction diluents, especially methanol. Typical reaction conditions include a reaction temperature from about 30° C. to about 150° C. and a reaction pressure from about 10 bar to about 100 bar. Subsequent to polymerization the terpolymer product is obtained as a material substantially insoluble in the reaction diluent and is recovered by conventional methods such as filtration or decantation. The terpolymer is used as produced or alternatively is purified as by contact with a solvent or complexing agent which is selective for catalyst residues.

The terpolymer product is converted to a non-stretched film or sheet prior to stretching or drawing by methods which are conventional for thermoplastics. In one modification, the terpolymer is extruded through a suitable die to produce the non-stretched film or sheet. In an alternate modification, the terpolymer in particulate form is compression molded at somewhat elevated temperatures to produce the sheet from which the stretched film is formed. The length and width of the non-stretched sheet are limited only by the size of the equipment available for the stretching process. The thickness of the sheet to be stretched is of some significance, depending upon the desired application and is typically from about 0.01 in. to about 0.05 in. thick. By whatever method the non-stretched sheet or film is produced, some care should be taken to prevent the inclusion within the sheet of foreign material, particularly non-thermoplastic foreign material, since the presence of such material often leads to the formation of holes or voids in the stretched film.

The terpolymers of the invention are stretched monoaxially, i.e., in one direction. The monoaxial drawing or stretching takes place at temperatures somewhat below the melting point of the particular terpolymer and the process is commonly referred to as cold drawing. Drawing temperatures are determined by the melting point and molecular weight of the polymer and are from about 4° C. to 15° C. below the melting point of the polymer, preferably from about 10° C. to 15° C. below the melting point of the terpolymer being monoaxially drawn.

In another embodiment, the terpolymers of the invention are stretched biaxially, i.e., in two directions, and are preferably biaxially stretched or drawn at a 90-degree angle although biaxial stretching at other angles is also satisfactory. Very suitably the drawing angle of the biaxial drawing is between 85° and 95°. The biaxial drawing or stretching takes place at temperatures determined by the melting point and the molecular weight of the polymer and are somewhat below the melting point of the terpolymer. Generally, drawing temperatures of from 4°–15° C. below the melting point of the polymer are satisfactory with drawing temperatures of about 10° C. below the melting point of the polymer being preferred.

The physical drawing of the polyketone terpolymer is accomplished by methods known in the art employing commercially available equipment. Equipment found to be suitable is available from Bruckner Maschenenbau of West Germany. One form of such equipment operates by clamping on the edges of the sheet to be drawn and, at an appropriate temperature, separating the edges of the sheet at a controlled rate. Alternatively, and preferably for commercial purposes, the biaxial drawing process is conducted continuously at high production rates in multistage roll drawing equipment, also available from Bruckner, where the drawing of the extruded sheet or film stock takes place in a series of steps between heated rolls rotating at different and increasing rates. When appropriate combinations of draw temperatures and draw rates are employed, draw ratios, i.e., the ratio of a dimension of a stretched film to a non-stretched film, for the monoaxial stretching will suitably be from about 4 to about 20 with draw ratios of from about 4 to about 10 being more common. A draw ratio of less than about 4 does not produce the desired degree of molecular orientation in the stretched film and the desired enhancement of physical properties is not obtained. Attempts to obtain a draw ratio of more than about 20 using known procedures and equipment will frequently lead to ruptures of the film.

The monoaxially and biaxially stretched or drawn films of the invention have a high degree of molecular orientation and are characterized by high mechanical strength and stiffness, even at relatively low draw ratios. The advantages of the invention are particularly evident when multiple plys of the film are laminated together in an alternating 90-degree biaxial arrangement. Such laminates have a high degree of clarity and are resistant to puncture by blunt objects, even those striking the film at high velocity. The polyketone films and laminates thereof have enhanced barrier properties towards oxygen and carbon dioxide, compared to, for example, oriented polyolefins, and unlike polyolefin films are directly printable by conventional inks and dyes. The terpolymer may incorporate conventional additives such as antioxidants, stabilizers, colorants, and slip and antiblock agents which do not unduly interfere with the stretching process and do not adversely affect the stretched film. A copolymer of ethylene and methacrylic acid marketed by DuPont under the trademark NUCREL ® is a preferred additive as a processing aid.

The stretched films and laminates are processable by conventional forming methods such as thermoforming and pressure forming and are shaped or forged by such methods into autoclavable shaped articles such as cooking bags or pouches or tubs and other containers for food and drink. The films are also suitably employed in packaging applications requiring greater high temperature resistance than that provided by polyolefins or PVC, and are useful as the base layer in a variety of laminates with other polymeric materials such as ethylene/vinyl acetate copolymers where the strength of the stretched polyketone terpolymer layer is sufficient to provide the necessary strength to the laminate.

The invention is further illustrated by the following Comparative Examples (not of the invention) and Illustrative Embodiments which should not be regarded as limiting the invention.

COMPARATIVE EXAMPLE I

A terpolymer of carbon monoxide, ethylene and 7% by weight based on total polymer of propylene was produced in the presence of a catalyst composition formed from palladium acetate, trifluoroacetic acid and 1,3-bis(diphenylphosphino)propane. The terpolymer had a melting point of 212° C., an average molecular weight of about 70,000 and an LVN, measured in m-cresol at 100° C. of 1.5 dl/g. This polymer was designated Polymer CE.

ILLUSTRATIVE EMBODIMENT I

A terpolymer of carbon monoxide, ethylene and 6% by weight based on total terpolymer of propylene was produced in the presence of a catalyst composition formed from palladium acetate, trifluoroacetic acid and 1,3-bis(diphenylphosphino)propane. This terpolymer had a melting point of 220° C., an average molecular weight of about 70,000 and an LVN, measured in m-cresol at 100° C., of 1.6 dl/g. This polymer was designated Polymer IE.

COMPARATIVE EXAMPLE II

A stretched, monoaxially drawn film was produced from an extruded film of Polymer CE using a Bruckner KARO ® II drawing apparatus operating at temperatures about 30° C. below the melting point of the polymer. The conditions of the drawing process and the properties of the resulting stretched film are shown in Table I.

ILLUSTRATIVE EMBODIMENT II

A stretched, monoaxially drawn film was produced from a compression molded film of Polymer IE using the Bruckner KARO ® II drawing apparatus operating at temperatures about 30° C.–40° C. below the melting point of the polymer. The conditions of the drawing operation and the properties of the resulting stretched film are shown in Table I, wherein a comparison is made with properties of a monoaxially stretched film of a commercial polypropylene.

TABLE I

| Sample | IE | CE | Polypropylene |
|---|---|---|---|
| Molecular wt. (est.) | 70,000 | 70,000 | 450,000 |
| Draw rate, cm/min | 50 | 50 | 25 |
| Draw temp. °C. | 183 | 180 | 100 |
| Monoaxial Draw ratio | 6.5 | 6.5 | 6.5 |
| Tensile at break, psi* | 98,000 | 80,000 | 44,000 |
| Elongation at break, % | 7 | 39.9 | 21.9 |
| 1% Tangent modulus, psi* | 1,200,000 | 380,000 | 750,000 |

*Higher numbers indicate better properties

Table I shows that at a draw ratio of 6.5, the monoaxially drawn terpolymer of this invention (mp 220° C.) has and exhibits better mechanical properties of tensile strength at break and tangent modulus (a measure of stiffness) than both similarly stretched terpolymer (MP 212° C.) and polypropylene. These superior mechanical properties differences are consistent with the values for elongation at break which shows that the monoaxially stretched terpolymer (MP 220° C.), has a value which is substantially lower than either similarly stretched terpolymer (MP 212° C.) or polypropylene.

ILLUSTRATIVE EMBODIMENT III

A linear alternating terpolymer of carbon monoxide, ethylene and 6.3% by weight based on total terpolymer of propylene was produced in the presence of a catalyst composition formed from palladium acetate, trifluoroacetic acid and 1,3-bis(diphenylphosphino)propane. The polymer had a melting point of 214° C. and an LVN, measured in m-cresol at 60° C., of 1.4 dl/g. The nascent reactor polymer was melt compounded by injection molding and then reground to coarse powder. The powder was compression molded into a 8×8×0.02-inches sheet. The properties of the compression molded sheet and stretched film produced therefrom were determined and are shown in Table II. The mechanical stretching was accomplished with a Bruckner KARO ® II unit for biaxial stretching of thermoplastic films operating in the biaxial drawing mode at temperatures which are instantaneously 10°–15° C. above the melting point of the polymer.

TABLE II

| Sample | Compression Molded | Biaxially Stretched | |
|---|---|---|---|
| Draw temp., °C. | — | 230° C. | |
| Draw rate, m/min | — | 0.75 | |
| Draw ratio | — | 4.5 | |
| Tensile strength at break, psi* | 10,000 | 23,000 | 20,000 |
| 1% Secant modulus, psi* | 101,000 | 314,000 | 270,000 |
| Elongation at break, % | 300 | 37 | 25 |
| $O_2$ Permeability,[b] $cm^3$-mil/100 $m^2$-d-atm | 5.5 | 7.8 | |
| $CO_2$ Permeability,[b] $cm^3$-mil/100 $m^2$-d-atm | 41.0 | 60.3 | |
| $CO_2$ Permeability/$O_2$ Permeability | 7.5 | 7.7 | |

[a]samples cut parallel to draw directions
[b]30° C., 0% relative humidity
*Higher numbers indicate better properties.

Table II shows that at a draw ratio of 4.5 and draw temperature of 230° C., both of which are within the inventive ranges, the biaxially stretched terpolymer likewise has and exhibits better mechanical properties of tensile strength at break and secant modulus than the compression molded terpolymer. These superior mechanical properties are also consistent with a substantially lower value for elongation at break of the biaxially stretched terpolymer relative to the compression molded terpolymer.

Thus, the data in Tables I and II support the inventive claims that subsequent to mono and/or biaxially stretching utilizing the processes of this invention, the useful polyketones (with MP at least 214° C.) show an unusually rapid increase in mechanical strength properties with extension.

What is claimed is:

1. A non-porous biaxially drawn terpolymer film of a linear alternating polymer of carbon monoxide, ethylene and a second ethylenically unsaturated hydrocarbon of at least 3 carbon atoms, wherein said terpolymer has a melting point of at least 214° C. made by the process comprising the steps of drawing a sheet of said film along two axes, at a draw ratio of from 4 to about 20, at a draw temperature of from 4° to 15° C. below the melting point of said terpolymer.

2. A product as in claim 1 wherein said second hydrocarbon is propylene.

3. A non-porous monoaxially drawn terpolymer film of a linear alternating polymer of carbon monoxide, ethylene and a second ethylenically unsaturated hydrocarbon of at least 3 carbon atoms, wherein said terpolymer has a melting point of at least 214° C. made by the process comprising the steps of drawing a sheet of said film along one axis, at a draw ratio of from 4 to 20, and at a draw temperature of from 4° to 15° C. below the melting point of the terpolymer.

4. A product as in claim 3 wherein said second hydrocarbon is propylene.

* * * * *